US008238001B2

(12) United States Patent
Klassen et al.

(10) Patent No.: US 8,238,001 B2
(45) Date of Patent: Aug. 7, 2012

(54) PATCH CODES USING A PROXIMITY ARRAY

(75) Inventors: R. Victor Klassen, Webster, NY (US); Stephen C. Morgana, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 102 days.

(21) Appl. No.: 12/852,661

(22) Filed: Aug. 9, 2010

(65) Prior Publication Data

US 2012/0033273 A1 Feb. 9, 2012

(51) Int. Cl.
*H04N 1/46* (2006.01)
*G03F 3/08* (2006.01)
*G06K 9/00* (2006.01)

(52) U.S. Cl. ........ 358/505; 358/504; 358/518; 382/162; 382/167

(58) Field of Classification Search .............. 358/1.9, 358/504, 505, 1.15, 3.23, 517, 518, 530, 358/537, 1.6, 2.1; 382/162, 167
See application file for complete search history.

(56) References Cited

U.S. PATENT DOCUMENTS

| | | | |
|---|---|---|---|
| 6,972,867 B1 * | 12/2005 | Venable et al. | 358/1.9 |
| 7,283,282 B2 * | 10/2007 | Sanger et al. | 358/1.9 |
| 7,436,549 B2 | 10/2008 | Venable et al. | |
| 2008/0030806 A1 | 2/2008 | Amarakoon et al. | |
| 2008/0204773 A1 * | 8/2008 | Morgana et al. | 358/1.9 |
| 2010/0025472 A1 | 2/2010 | Morgana et al. | |

OTHER PUBLICATIONS

A raster-based method for computing Voronoi diagrams of spatial objects using dynamic distance transformation, Research Article, International Journal of Geographical Information Science, Taylor & Francis Ltd. 1999, vol. 13, No. 3, 209-225.

\* cited by examiner

*Primary Examiner* — Charlotte M Baker
(74) *Attorney, Agent, or Firm* — Fay Sharpe LLP

(57) ABSTRACT

Patches are generated from the overprinting of one or more separations to encode four or more values per patch each color representing a numerical value. In a calibration step, all possible color overprint combinations are printed multiple times on a calibration sheet. The sheet is scanned and each overprinted patch is entered in to a proximity array, which is a volume data structure representing three dimensional (3D) color space). After all calibration colors are entered, the proximity array is repeatedly dilated. Later, sheets that need to be identified are printed with a code number encoded as one or more patch codes. The sheet is scanned and the patch code colors are looked up in the proximity array to determine which original colors were printed. The identified colors are converted the code number. Patch codes are further augmented with error detection and optionally error correction bits to further increase robustness.

40 Claims, 4 Drawing Sheets

PATCH CODES USING A PROXIMITY ARRAY

BACKGROUND

The exemplary embodiments disclosed herein relate to the use of color patch codes in a printed image for conveying information about the content of the image. More particularly, they relate to patch codes for color calibration job identification encoding, although it is to be appreciated that the exemplary embodiments have other applications.

By way of background, there are two phases involved in the color correction of a color printer: calibration and characterization. Calibration involves maintaining the printer at a defined state, while characterization involves determination of the multidimensional transformation or profile that relates device color signals (e.g., cyan, magenta, yellow, and black) to spectrophotometric or colorimetric signals (e.g., CIELAB color scale). Characterization is performed relatively infrequently, sometimes only once at the factory that produces the printer. Calibration, on the other hand, needs to be performed often to compensate for printer drift and bring the device back to its nominal state. While the term calibration will be used throughout, the concepts also apply equally to the characterization process.

The calibration process involves sending an image with pre-specified device signals (i.e., a target) to the printer, and making spectrophotometric measurements of the print with the use of a spectrophotometric scanner. The device and spectrophotometric signals together are used to build or update the calibration tables. In a production environment, many printers, perhaps thirty to forty, might be going through a calibration process at the same time. In a typical environment, operators must manually keep track of each printed page, and there can be many printed target types printed for each printer. The operator must then feed each page to a spectrophotometric scanner and tabulate results of scanning each target type. The results of each scan must be manually associated to the corresponding printed target, and to the correct printer. Considering the quantity of pages printed and the amount of work necessary to manually track each printed page, there is considerable possibility for error. Pages can be accidentally misordered, and scanning results can accidentally be associated with an incorrect printed target or printer. This can result in highly inaccurate calibrations, and calls upon the difficult task of diagnosing the errors.

When more than one page is used in color calibration, such as when calibrating multiple printers, or using multiple sheets per printer, there is the opportunity for human error in which the pages get mixed up and the wrong calibration(s) result. A method of reducing such error is through using patch codes, which is described, for example, in U.S. Pat. No. 6,972,867 to Venable, et al., entitled, PATCH CODES FOR COLOR CALIBRATION JOB IDENTIFICATION ENCODING. Typically one bit per CMY separation may be encoded per patch. Even with only one bit per separation, variations between printer models are sufficient to cause occasional read errors. One solution is to reduce the number of colors further (eliminating blue, which is too similar to black on some printers), or hand tune the colors to be more distinct.

US 2008/0204773, by Morgana and Klassen, describes an improved patch code method that uses a simple calibration step and RGB distance computations for patch code decoding. That method works well for well-behaved printers; however, sometimes fails when printers are in stress conditions. The exemplary embodiments presented herein are more robust to printer variation.

It would be desirable, therefore, to provide automation to the color printer calibration process, breaking the cycle where an operator must keep track of all details. It is further desirable that the job identification data be encoded according to a scheme wherein job identification data is printed according to a protocol and in a format approximately identical to a format of the target.

INCORPORATION BY REFERENCE

The following references, the disclosures of which are incorporated herein in their entireties by reference, are mentioned:

U.S. Pat. No. 6,972,867, issued Dec. 6, 2005, and U.S. Pat. No. 7,436,549, issued Oct. 14, 2008, both entitled PATCH CODES FOR COLOR CALIBRATION JOB IDENTIFICATION ENCODING, by Venable, et al., disclose a color calibration job identification system and method in which job identification data is encoded on a printed page, in a patch code, along with color targets.

U.S. Pub. No. 2008/0204773, by Morgana et al., entitled PATCH CODES WITH IMPROVED ROBUSTNESS, relates to patch codes for color calibration job identification encoding.

BRIEF DESCRIPTION

In accordance with aspects of the exemplary embodiments, in one method patches are generated from the overprinting of one or more separations to encode four or more values per patch each color representing a numerical value. In a calibration step, all possible color overprint combinations are printed multiple times on a calibration sheet. The sheet is scanned and each overprinted patch is entered in to a proximity array (a volume data structure representing three dimensional (3D) color space). After all calibration colors are entered, the proximity array is repeatedly dilated. Later, sheets that need to be identified are printed with a code number encoded as one or more patch codes. The sheet is scanned and the patch code colors are looked up in the proximity array to determine which original colors were printed. The identified colors are converted the code number. Patch codes are further augmented with error detection and optionally error correction bits to further increase robustness.

In accordance with another aspect of the exemplary embodiments, an alternative method to encode information at the pixel level is provided. The underlying difference is in the colors used to train. Many new applications are enabled by this change, including simplified decoding of one dimensional (1D) colored barcodes, decoding two dimensional (2D) colored barcodes, and separating obfuscated images, and separating a spot color from a scan.

In one embodiment, a method of processing identified colors is provided. The method includes storing nominal colors and actual colors at array locations in a proximity array and dilating the proximity array until each array location contains a nominal color and an actual color and the actual color is an identified color closest to the color corresponding to that array location. And for at least one nominal color, a plurality of actual colors is stored for the same nominal color. Optionally, the dilation step may further include identifying a source voxel having a given nominal color and determining whether a neighboring voxel is occupied. If the neighboring voxel is not yet occupied, the nominal color value of the source voxel is assigned to the neighboring voxel. If the neighboring voxel is occupied, a value of the neighboring voxel is replaced only if the nominal color of the neighboring voxel is closer to the nominal color of the source voxel than to the nominal color already in that voxel.

In another embodiment, a digital image processing apparatus for processing identified colors is provided. The apparatus includes a database that stores data related to digital image processing and an image processing unit that includes a processor, a system memory, and a system bus that couples the system memory to the processing unit. Further, the image processing unit is operative to store nominal colors and actual colors at array locations in a proximity array and dilate the proximity array until each array location contains a nominal color and an actual color and the actual color is an identified color closest to the color corresponding to that array location, wherein, for at least one nominal color, a plurality of actual colors are stored for the same nominal color. Optionally, the image processing unit is further operative to: identify a source voxel having a given nominal color; determine whether a neighboring voxel is occupied; if the neighboring voxel is not yet occupied, assign the nominal color value of the source voxel to the neighboring voxel; if the neighboring voxel is occupied, replace a value of the neighboring voxel only if the nominal color of the neighboring voxel is closer to the nominal color of the source voxel than to the nominal color already in that voxel.

In yet another embodiment, a computer program product is provided. The computer program product includes a computer-usable data carrier storing instructions that, when executed by a computer, cause the computer to perform a method. The method includes storing nominal colors and actual colors at array locations in a proximity array, and dilating the proximity array until each array location contains a nominal color and an actual color and the actual color is an identified color closest to the color corresponding to that array location. And for at least one nominal color, a plurality of actual colors is stored for the same nominal color. Optionally, the step of dilating the proximity array further includes: identifying a source voxel having a given nominal color, determining whether a neighboring voxel is occupied, if the neighboring voxel is not yet occupied, assigning the nominal color value of the source voxel to the neighboring voxel, and if the neighboring voxel is occupied, replacing a value of the neighboring voxel only if the nominal color of the neighboring voxel is closer to the nominal color of the source voxel than to the nominal color already in that voxel.

DETAILED DESCRIPTION

The Proximity Array

Figure 1:
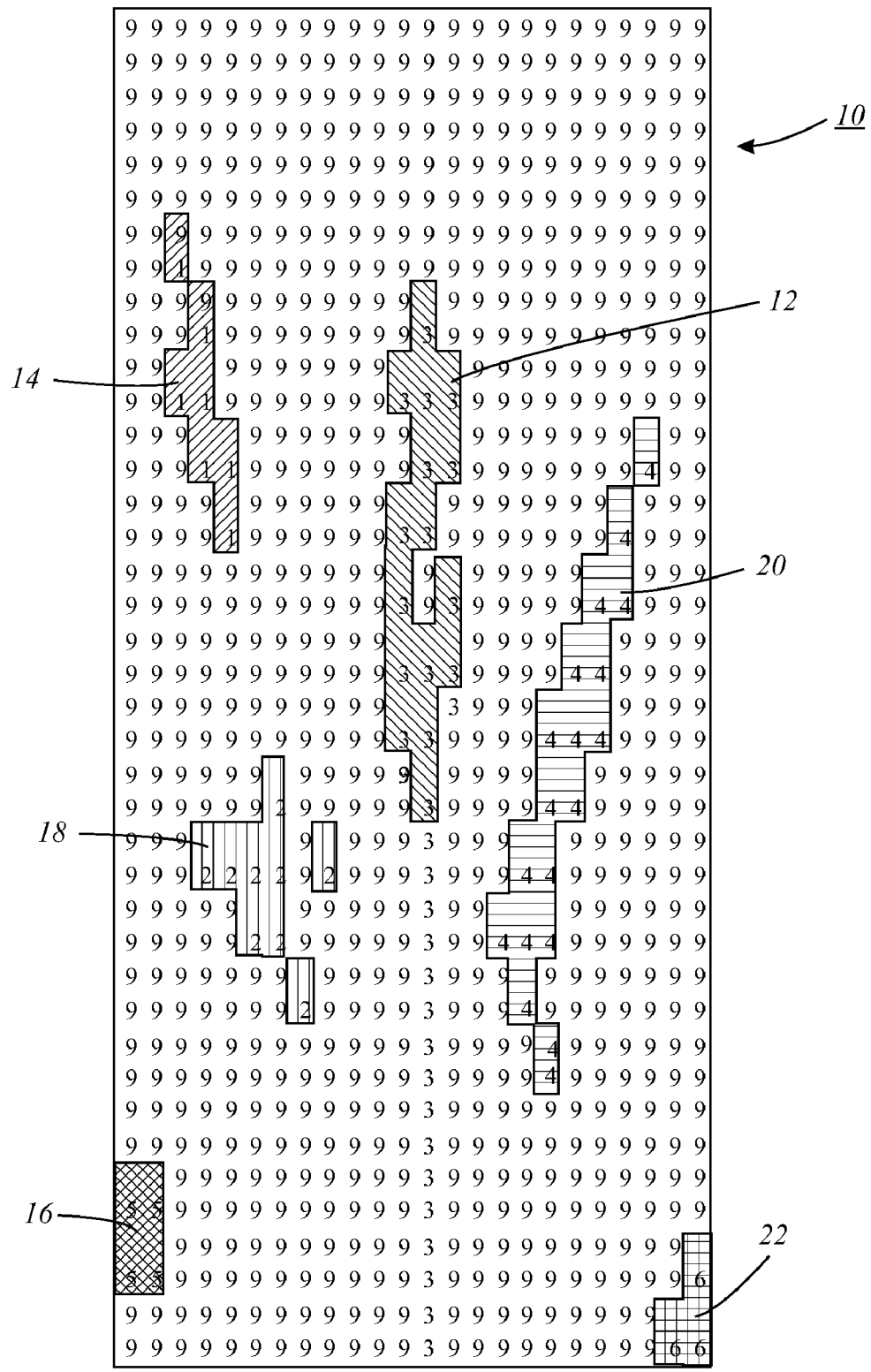
FIG. 1 shows seed points in a proximity array with convex and non-connected point sets.

One often has a need to find the closest point in some set of target points to a given probe point. Various techniques of doing so have been used in the past, including the Voronoi diagram and its higher dimensional analogues. A Voronoi diagram divides space into convex regions, each of which contains all points that are closer to its contained target point than to any other target point. Creating a Voronoi diagram on its own does not accelerate finding the closest point to a given probe point—one must still linearly search (on average half) the convex regions to determine which one contains the probe point.

For small sets (fewer than, say 10) of points the most efficient search may be simply linear search. As the cardinality of the target set grows, more complex data structures become more worthwhile. Two such data structures that have been used for moderate-dimensional query are the binary space partitioning (BSP) tree and the quad-tree and its higher dimensional analogues. With these data structures, a leaf node contains a list of all points that are the closest point for some part of the represented region. One approach is to divide three dimensional space into a 3-dimensional array of sub-cubes and in each sub-cube store a list of all points within a given distance of the sub-cube centre. Considering only the high order bits of a color allows one to rapidly find the sub-cube containing the list of points most likely to be closest.

We are interested in applications in which the colors used as target and probe points are measured with some (small) amount of error. Target points are samples with some distribution about a mean color, all of which correspond to the same nominal color. A nominal color might be specified using a device dependent color description such as CMYK for some printer, and the target points might be samples of RGB values measured from a set of patches of that nominal color. Depending on the location in color space, the shape of the distribution might vary. For example, if only one separation is non-zero, one would expect the distribution to be (nearly) confined to a line (or curve) in three dimensional color space. If two separations are non-zero the distribution would be (nearly) confined to a two dimensional surface. And when three or more separations are present, a three dimensional cloud of points could represent the distribution. The cloud might be radially symmetric, but there is no reason to assume that it will be. One would expect it to generally be ellipsoidal in an appropriately chosen color space, but the axes of the ellipsoid may be curved in some other color spaces.

Instead of measured data, perceived color might be represented in a similar way. Here we would be interested in the mapping from color as measured or specified to color as named. For example, a nominal color could be given as "sky blue" and the distribution would then include all measured colors that some observer or group of observers had described with the name "sky blue".

One way of computing an approximate (two-dimensional) Voronoi diagram is based on raster dilation. In a nutshell, an array of distances (the raster) is initialized to the largest representable value. Then each point is entered in its corresponding location, along with a distance of 0. We refer to entering the initial points as seeding the array. If the point labels are small integers, they can be packed in the low order portion of a single word containing the distance in its high order portion. In one pass, the distance at each location is compared to the distances at the three locations above and to the left, as augmented by the distances to those points. If the distance to some neighbor plus the distance stored at that neighbor is less than the distance already stored at a point, the distance stored at that point, and its label are updated. The way of computing distance affects the shape of the regions computed.

The raster-based Voronoi diagram provides an easy approximate way of finding the "closest" point, for some definitions of closest, for any set of points that may be readily represented using moderate precision coordinates. The three dimensional analogue is a straightforward extension to the two-dimensional versions. Higher dimensions are equally straightforward, although memory requirements rapidly increase as the number of dimensions increases.

Certain distance functions lend themselves more naturally to the algorithm. The present method applies a slight variant. A cell's actual current distance to its nearest known target point is stored, and, when a region grows to include a cell with a previously known target point, the actual distance to the new candidate target point is calculated and used in the comparison. Thus, any (reasonable) color distance metric may be used when calculating distances.

Raster-based Voronoi diagrams extend naturally from points to objects (rasterize the objects into the frame buffer, and then grow the regions). Described herein is a slightly different extension, which is to go from single points to point clouds. Every point in a cloud has the same nominal color, and might result from the points sharing a color name (as determined by human observers) or from them having been printed with the same colorant specification and then measured. Because the raster provides distance information, and to distinguish it from the more restrictive term "Voronoi diagram", it is called a "proximity array". Each point has its own color coordinates, which determine where it seeds the proximity array, and which are used in distance calculations. In addition, each point has a reference to its nominal color: there will typically be many points with the same nominal color. Once the proximity array has been built, a query comprises finding the cell containing the query point, and returning the nominal color found.

FIG. 1 shows an example of a proximity array 10 in which the same nominal color appears multiple times (six colors). In order to distinguish each of the six colors in a black-and-white document, each color is represented in FIG. 1 and all remaining figures by a unique format of cross hatches, dots or shade of gray. A yellow color grouping 12 is represented by diagonal cross hatching that slopes downward towards the right side. A magenta color grouping 14 is represented by diagonal cross hatching that slopes upward towards the right side. A cyan color grouping 16 is represented by diagonal cross hatching. An orange color grouping 18 is represented by vertical cross hatching. A green color grouping 20 is represented by horizontal cross hatching. Finally, a blue color patch 22 is represented by a checkerboard pattern.

Figure 2:
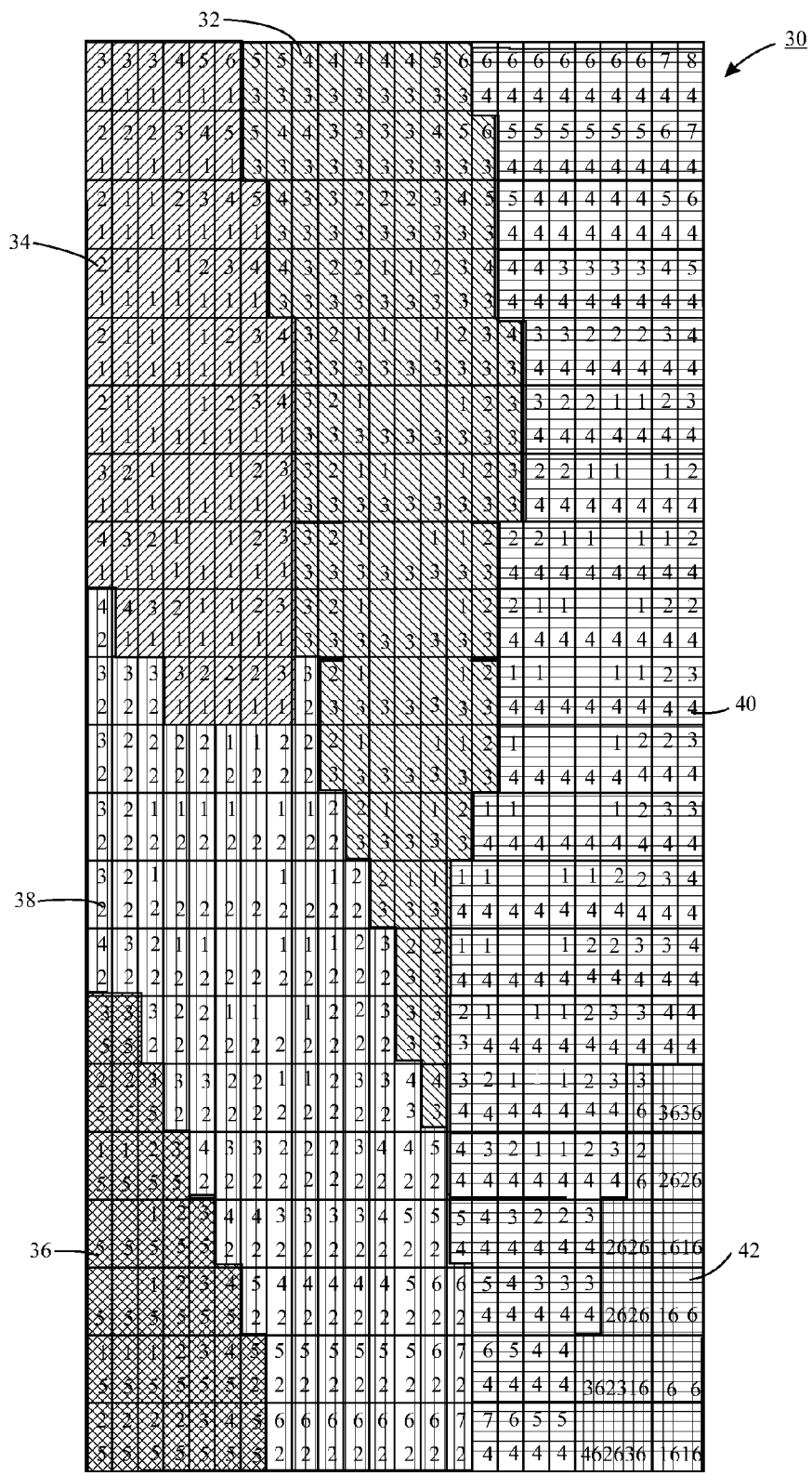
FIG. 2 shows the proximity array resulting from the seed points of FIG. 1.

The proximate array 10 of FIG. 1 may be dilated, as described earlier. In this regard, FIG. 2 shows a dilated proximity array 24 after two dilation passes. A yellow color grouping 32 is represented by diagonal cross hatching that slopes downward towards the right side. A magenta color grouping 34 is represented by diagonal cross hatching that slopes upward towards the right side. A cyan color grouping 36 is represented by diagonal cross hatching. An orange color grouping 38 is represented by vertical cross hatching. A green color grouping 40 is represented by horizontal cross hatching. Finally, a blue color patch 42 is represented by a checkerboard pattern.

A proximity array is relatively fast to build and very rapidly provides the closest color to a given probe color to within an error that depends on the resolution of the grid. Allocating 32 bits per cell (8 for an index into a table of nominal colors, 24 for the distance to the nearest nominal color), a table that divides color space up into 128 bins in each of three dimensions requires 32 Megabytes, not out of the question on modern machines. Good results can be had with 64 bins in each dimension, requiring only 4 Mbytes to build the array. If memory is at a premium, the distances may be discarded once the array has been computed, reducing the total size to 1 Mbyte.

Patch Codes

As described, for example, in the '867 patent, a patch code is a sequence of color patches, each of which is selected from a set of colors that are readily distinguished from each other on any printer, whether or not it is calibrated. Good candidates for patch codes are the primary colorants cyan, magenta, yellow, the secondary mixtures red, green, blue, paper white, and mid-gray. Black is not used because of possible confusion with blue. Also, rendition of a good black often requires an optimum combination of cyan (C), magenta (M), yellow (Y), and black (K). This requires intimate knowledge of the printing process, which may not be known at the time of calibration. This set of eight patch codes allows each patch to encode three bits of data, or a single digit in an octal numbering system.

The exemplary embodiments provide improvements over the methods of the '867 patent and others by increasing the information density of a single patch. That is, less page real estate is consumed with patch codes. By adding parity checking, and potentially error detection and correction codes, robustness is further assured. The exemplary embodiments improve over US 2008/0204773 by using more patches in the calibration step (which makes it more robust), and the decoding step is accomplished without distance computations (which speeds it up).

Figure 3:
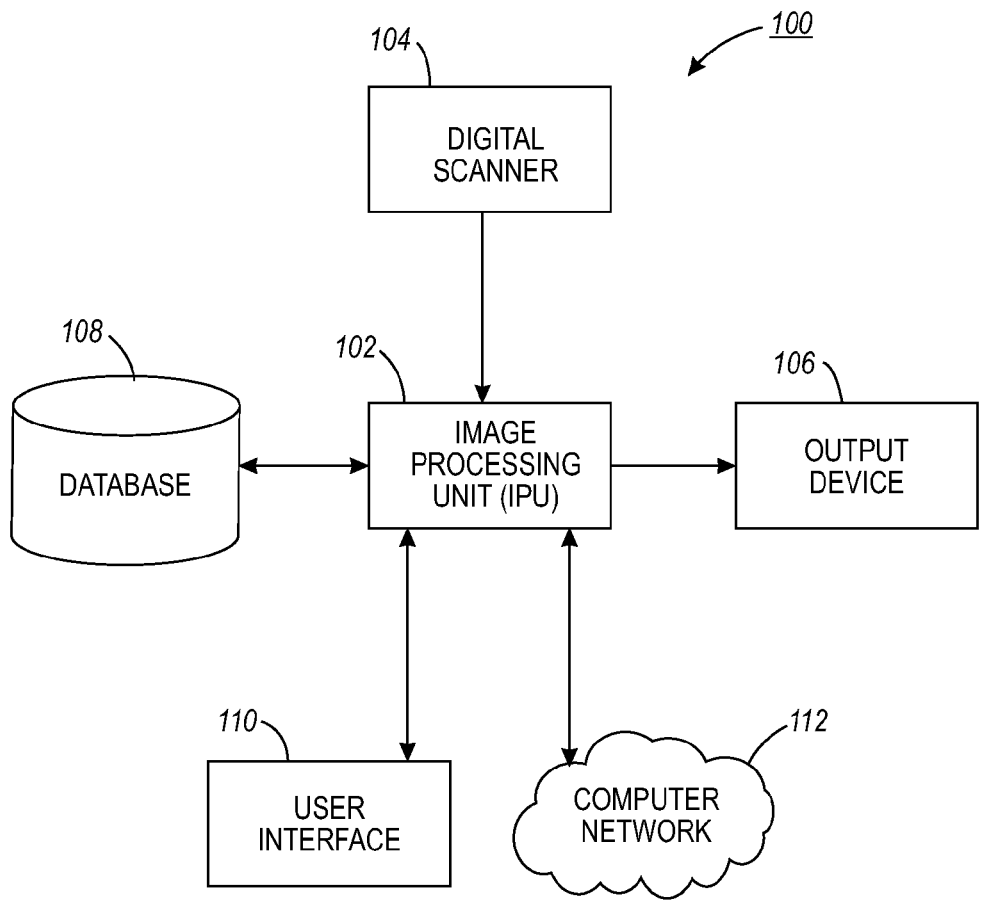
FIG. 3 is a block diagram illustrating a digital image processing apparatus suitable for implementing the exemplary methods.

FIG. 3 diagrammatically illustrates a digital image processing apparatus 100 for implementing the exemplary methods. The digital image processing apparatus 100 formed in accordance with the exemplary embodiment comprises an image processing unit (IPU) 102 for performing digital image processing and other electronic computational operations.

A computer is one possible hardware configuration for the IPU 102. It is to be appreciated that although a standalone architecture is illustrated, that any suitable computing environment can be employed in accordance with the present embodiments. For example, computing architectures including, but not limited to, stand alone, multiprocessor, distributed, client/server, minicomputer, mainframe, supercomputer, digital and analog can be employed in accordance with the present embodiment.

Although not specifically shown in the figure, the IPU 102 typically includes a processing unit, a system memory, and a system bus that couples various system components including the system memory to the processing unit. The processing unit can be any of various commercially available processors. Dual microprocessors and other multi-processor architectures also can be used as the processing unit.

The system bus can be any of several types of bus structure including a memory bus or memory controller, a peripheral bus, and a local bus using any of a variety of commercially available bus architectures. The computer memory includes read only memory (ROM) and random access memory (RAM). A basic input/output system (BIOS), containing the basic routines that help to transfer information between elements within the computer, such as during start-up, is stored in ROM.

The IPU 102 can further include a hard disk drive, a magnetic disk drive, e.g., to read from or write to a removable disk, and an optical disk drive, e.g., for reading a CD-ROM disk or to read from or write to other optical media. The IPU 102 typically includes at least some form of computer readable media. Computer readable media can be any available media that can be accessed by the computer. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other magnetic storage devices, or any other medium which can be used to store the desired information and which can be accessed by the computer.

A number of program modules may be stored in the drives and RAM, including an operating system, one or more application programs, other program modules, and program non-interrupt data. The operating system in the IPU 102 can be any of a number of commercially available operating systems.

The IPU 102 is operably coupled to a digital image scanner 104 that receives an image as input and derives digital image data representative of the image as is well understood in the art. The term "scanner" as used herein is intended to encompass all devices that receive image data and derive digital image data therefrom. Examples of scanners include document scanners that receive printed images as input and digital cameras that receive optical images as input. The IPU 102 receives the digital image data from the scanner 104 as input.

For color calibration applications, to maximize robustness, it is often desirable to minimize the number of times a human operator has to manipulate printed pages. It is therefore preferable to have a scanner that scans for spectrophotometric values (calibration data) also scan for job identification information. A spectrophotometric scanner typically used for calibration moves to a particular coordinate and then commences scanning for color values. One such scanner may be a Gretag spectrophotometer (from X-Rite Corporation). Using a scanner of this type results in implementation of an encoding scheme that will function in that mode, wherein job identification data is printed according to a protocol and in a format approximately identical to the format of the calibration data. A patch code scheme satisfies the aforementioned issues.

For some applications, a non-spectrophotometric scanner, such as an RGB scanner may be used in printer calibration. While such a scanner has higher spatial resolution, and could use any of many forms of identification, the software used for reading patches from a calibration page is readily adapted to read patch codes as well. Furthermore, it is sometimes useful to have a sheet that may be read and identified by either device, such as when characterizing a non-spectrophotometric scanner with a spectrophotometer.

The IPU 102 is also operably coupled to one or more output devices 106 that receive digital image data from the IPU 102. The image output device(s) 106 may comprise a digital data storage device that stores the digital image data for later retrieval (e.g., CD-ROM, magnetic media, or other storage medium), a video display terminal that generates a visual image based upon the digital image data, and/or a printer that generates a "hard copy" printed image based upon the digital age data.

As illustrated herein, the IPU 102 is optionally connected to a computer network 112. As such, the IPU 102 can send digital image data to and receive digital image data from any network(s) to which it is connected. The IPU 102 can operate in a networked environment using logical and/or physical connections to one or more remote computers, such as a remote computer(s). The remote computer(s) can be a workstation, a server computer, a router, a personal computer, microprocessor based entertainment appliance, a peer device or other common network node, and typically includes many or all of the elements described relative to the computer. The logical connections depicted include a local area network (LAN) and a wide area network (WAN). Such networking environments are commonplace in offices, enterprise-wide computer networks, intranets and the Internet. When used in a LAN networking environment, the computer is connected to the local network through a network interface or adapter. When used in a WAN networking environment, the computer typically includes a modem, or is connected to a communications server on the LAN, or has other means for establishing communications over the WAN, such as the Internet. In a networked environment, program modules depicted relative to the computer, or portions thereof, may be stored in the remote memory storage device. It will be appreciated that network connections described herein are exemplary and other means of establishing a communications link between the computers may be used.

The IPU 102 is also operably coupled to a digital image database 108 that stores data related to digital image processing. This digital image database 108 can be a simple fixed magnetic disk drive and/or removable magnetic disk, an optical media reader (e.g., a CD-ROM input device) that receives an optical storage medium, and/or any other suitable digital image data storage device that includes and/or is adapted to receive and read a digital image storage medium.

The apparatus 100 of FIG. 3 may optionally comprise a user interface (UI) 110 operably coupled to the IPU 102. The UI 110, which comprises any suitable input/output device, is used by a user to receive information from and input information to the image processing unit. Suitable user interface devices include keyboards/keypads, mechanical buttons/switches, video display terminals with graphical user interfaces, pointing devices such as a joystick or mouse, voice command input devices, touch screens and/or any other suitable input/output device by which a user can receive information from and input information to the IPU 102.

Those of ordinary skill in the art will recognize that it is possible for some overlap to exist in connection with the UI 110 and output device(s) 106. For example, a video display terminal or screen of the output device 106 can also be part of the UI 110 and provide visual information to the user.

Those of ordinary skill in the art will also recognize that an apparatus formed in accordance with FIG. 3, including the IPU 102 can be provided by a wide variety of known systems. For example, the apparatus 100 of FIG. 3 can be provided by a xerographic or electrophotographic digital image reproduction apparatus (i.e., a digital copier).

Figure 4:
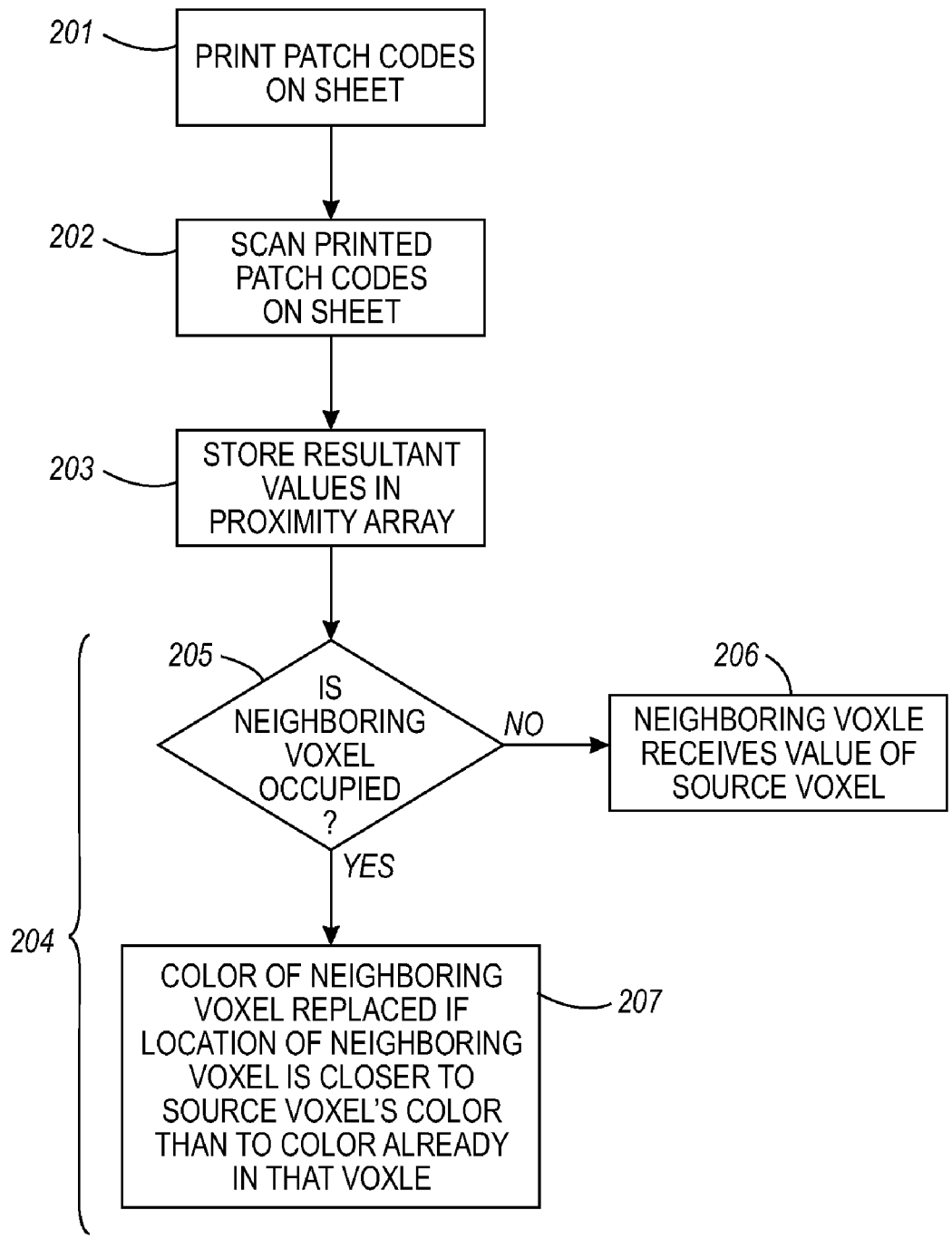
FIG. 4 is a flow chart of an exemplary patch code method using a proximity array.

With reference to FIG. 4, an exemplary method of using a proximity array is illustrated. The method may employ the apparatus 100 illustrated in FIG. 3. It is to be appreciated that the exemplary method may include fewer, more, or different steps from those shown and need not proceed in the order illustrated. The method illustrated in FIG. 4 may be implemented in a computer program product that may be executed on a computer. The computer program product may be a tangible computer-readable recording medium (such as a disk or other memory storage device) on which a control program is recorded, or may be a transmittable carrier wave in which the control program is embodied as a data signal. The illustrated method may be entirely automated or may include some user input, as noted herein. As shown in FIG. 4, the exemplary method involves calibrating the patch codes by using the output device 106 to print one or more copies of each patch code to be later read (201), using the digital scanner 104 to scan the printed patches (202), and then storing the resultant values (nominal and actual colors) in a proximity array in the database 108 (203).

The code patches in the calibration sheet have some random variation added to them to make the decoding step less prone to error due to printer variation. The random variation is applied separation by separation. Thus, a patch that is, say, 50% cyan, would be printed for calibration using 50%±s, for some value of s expected to cover the range of variation in a real printer, and between printers of the same model. A patch of 100% red, on the other hand, would be printed for calibration using a range from 100% down to 100%−s, for each of magenta and yellow (independently).

As described earlier, a proximity array as used in this application is a three-dimensional data structure describing color space where each location (voxel) contains the scanned value of a patch and the nominal color that was printed in the patch.

As used herein, the term "voxel" is a volume element, representing a region on a regular grid in three-dimensional space. This is analogous to a pixel, which represents 2D image data in a bitmap. As with pixels in a bitmap, voxels themselves do not typically have their position (their coordinates) explicitly encoded along with their values. Instead, the position of a voxel is inferred based upon its position relative to other voxels (i.e., its position in the data structure that makes up a single volumetric image).

After all calibration patches are entered into the proximity array, a dilation step (204) is performed repeatedly by the image processing unit 102 until each array location contains a nominal color and an actual color and the actual color is an identified color closest to the color corresponding to that array location.

In the dilation step (204), voxels are dilated to neighboring voxels. That is, a source voxel having a given nominal color is identified and then a determination is made as to whether the neighboring voxel is occupied (205). If the neighboring voxel is not yet occupied, it receives the nominal color value of the source voxel (206). If the neighboring voxel is occupied, then the value is replaced only if the location of the neighboring voxel is closer to the source voxel's color than to the color already in that voxel (207). Note that "closer" can be measured in various ways, and preferably not by Manhattan distance (i.e., the distance between two points measured along axes at right angles). On each pass, only nearest neighbors are considered. Dilation passes stop when no voxels change on a pass. The exemplary method may also include receiving a target color, using the target color to index into the proximity array, and determining the nominal color corresponding to the target color. Note that the nominal colors may be either actual color names in a natural language or references to color names in a natural language.

Optionally, the exemplary method may include printing one or more copies of a plurality of patches corresponding to patch codes and then measuring the printed patches, wherein the actual colors are the measured colors. The step of measuring the printed patches may include scanning the printed patches with a scanner, locating at least one patch, and averaging pixel values within the patch.

With this method individual printers are not calibrated, as the calibration step above only requires a representative printer and scanner.

More particularly, a code number for a page is encoded into one or more patch codes and printed. Subsequently, the page is scanned and the patch code patches red, green and blue (RGB) values are looked up directly in the proximity array to obtain the nominal patch code color that was printed. By knowing which colors were overprinted to produce the patch code color, bits of the code number are reconstructed to produce the code number.

The exemplary embodiments allow for patch codes made up of the overprinting of arbitrary base colors. The method has been tested for cyan, magenta, yellow base colors producing eight overprint colors, allowing for three bits of information per patch, and for cyan, half cyan, magenta, half magenta, yellow, half yellow, allowing for twenty-seven variations, or between four and five bits of information per patch. It is possible to use other colors carefully selected to allow for more bits per patch without reducing the robustness of the decoder. At four levels of each separation (0, ⅓, ⅔ and 1), the method encountered some ambiguous colors—colors that mapped to the same proximity array location before dilation, despite having different nominal color. One could eliminate one of each pair when a collision occurs as colors are first inserted into the proximity array. On the printer we tried (beginning with four levels), this left 61 out of a possible 64, significantly more than the 27 possible with only three levels. Any set of actual levels can be used, selected so as to minimize collisions. In practice, on a printer/scanner combination we have used (0, 0.25, 0.5 and 1.0) for the four levels.

Using full grey component replacement (GCR) reduces the opportunity for ambiguity. First, colors that would be printed with C=M=Y>0 vary in one dimension rather than three if a simple full GCR scheme is adopted. GCR is the separation technique where black ink is used a combination of cyan, magenta, and yellow equivalent to the black added. Second, colors that would be printed with two separations the same and the third one greater (e.g., ⅓, ⅓ and ⅔) are replaced with colors with only two separations, and one fewer dimension in which to vary. Turning on full GCR reduces the number of ambiguous colors in a four-level system from eleven to five. Due to the combinations of collisions in one test, this only reduced the total available colors to sixty (from sixty-four).

The use of error detection and correction codes represents an improvement over the prior art. In the simplest embodiment this comprises one parity bit per pair of patches. Due to its robustness when encoding a higher number of bits per patch, the exemplary embodiments present an advantage over US 2008/0204773, for example, in that fewer patch code patches are required, thus allowing more bits to be set aside for error correction and detection.

To summarize, patches are generated from the overprinting of one or more separations to encode eight or more values per patch, with each color representing a numerical value. In a calibration step, all possible color overprint combinations are printed multiple times on a calibration sheet. The sheet is scanned and each overprinted patch is entered into a proximity array. After all calibration colors are entered, the proximity array is repeatedly dilated. Later, sheets that need to be identified are printed with a code number encoded as one or more patch codes. The sheet is scanned and the patch code colors are looked up in the proximity array to determine which colors were printed. The identified colors are converted to the code number. Patch codes are further augmented with error detection and optionally error correction bits to further increase robustness.

The exemplary method adds additional variations to the calibration sheets to improve the robustness and uses a proximity array rather than simple closeness measure in Euclidean distance for decoding. The variations mimic variations that would likely be seen due to print-to-print variation. The use of a proximity array provides a better measure of closeness and thus more available code levels are possible for the same level of robustness as well as a more efficient way for decoding.

The exemplary method described above provides a very compact way of encoding a rich quantity of information relevant to printer calibration, such as the machine serial number, the page (if multiple pages are used in a calibration), and any other settings that might be of use in further processing.

The use of a scanner in the exemplary method described above is not intended as limiting. A spectrophotometer, such as the XRITE DT41 could be used in its place, providing device independent colors, such as L*a*b* as measured output signals. These values could then be used in much the same manner as patch-average RGB values are used when a scanner is used.

The method illustrated in FIG. 4 may be implemented in a computer program product that may be executed on a computing device. The computer program product may be a tangible computer-readable recording medium on which a control program is recorded, such as a disk or a hard drive. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other medium from which a computer can read and use Separating Overlaid Images It is sometimes desirable to extract the original printed color separations from a scan of a print, such as when a print was made with a spot color logo on it. It would be beneficial to obtain the spot color separation from a scan of the print before re-printing. Also, in the area of information obfuscation a number of monochrome images can be printed in overlaid color separations, producing an image with a scrambled appearance, upon scanning the images can be re-separated in to the original images. The same functionality is needed in processing color overlaid barcodes, Due to the fact that typical scanner RGB sensors are not matched to a printer's CMY toner set, the simple method of using the inverted RGB scanner separations directly fails.

In essence the method described below builds a proximity array, which as described earlier is a three dimensional array, containing at each location, the nominal color closest to the actual color corresponding to that location.

The method as described above with reference to patch codes works well for patches of color that are on the order of fifty pixels across, but does not work quite as well for patches the size of halftone dots. With large patches, the edges of the patch areas can be ignored in the patch averaging process. Edge pixels contain colors that are intermediate between the colors on each side of the edge and would be misclassified by the method. When dealing with halftone dots at the pixel level, no averaging can be performed and edge pixels cannot be avoided.

The alternative embodiments described below solve the problem of edge pixels by using only colors at corners of CMY space, and then adding colors to the calibration step along the lines in color space between each possible pair of primary color and overprint combination. Here 'primary color' is taken to mean any color where not more than one separation is printed (i.e. for a CMY space, it would be the four colors cyan, magenta, yellow and white). Similarly 'overprint is taken to mean any color where at least two separations are printed (again, for a CMY space, it would be the four colors red, green, blue and black). As described above, when the intermediate line colors are added to the proximity array, random variation is added to the color to account for the variation found in the print and scan. In practice, with a 64×64×64 proximity array we can calibrate with four steps along the line between the color pairs without significant collisions in the proximity array. The decoding process proceeds exactly the same as above.

There are various applications of the alternative embodiments described herein. In this regard, the exemplary method may further include the concept of calibrating for at least two color separations on a printer. That is, at least two copies of at least two distinct primary or overprint colors are printed, at least two copies of at least one color that is a linear combination of the two distinct primary or overprint colors is printed, and the printed colors are measured, wherein the actual colors are the measured colors. Further features may be incorporated as set forth below.

1. Spot color separation. When a printer has a spot color separation, it is desirable to be able to scan prints previously made containing the spot color and re-separate the spot color channel before re-printing. Without spot color separation, copies made of a print containing spot color will have that spot color reproduced in process color. The exemplary method can be calibrated for the normal CMY separations plus the spot color to perform this operation. During the decoding process, an image buffer is maintained to indicate where the spot color was detected in the scanned image. For each pixel in the image, the pixel's color is looked up in the proximity array to get the nominal color for the pixel. This nominal color is used to determine if the spot color was present in the scanned pixel. If the color is present the corresponding pixel in the image buffer is set on, otherwise it is set off. The image buffer can then be used to print the spot color in the appropriate places for copies of the scanned image.

In this regard, the exemplary method may further include printing at least two halftoned images using at least two distinct primary colors, wherein the primary colors are colors in which at least two halftoned images were printed. Optionally, at least one of the two distinct primary colors may be a spot color and the primary color may include at least one spot color.

2. Information obfuscation. A half-toned monochrome image per primary can be overprinted, producing an unintelligible print. Upon scanning and decoding the original images can be reconstructed. In this way information can be obfuscated from casual observations. During the decoding process, an image buffer is maintained per primary separation. For each pixel in the scanned image, the pixel's color is looked up in the proximity array to get the nominal color for the pixel. This nominal color is used to determine which of the primary colors were overprinted at that pixel. The corresponding pixels in the image buffers are set on or off based on which colors were overprinted reproducing the half-tone monochrome images in the image buffers.

3. Colored Barcodes. US 2010/0025472, entitled Colored Barcode Decoding, by Morgana et al., describes a method for overprinting a number of monochrome, one dimensional barcodes in primary color separations for subsequent scanning and decoding back into individual barcodes. The best color decoding at the time of filing was based on US 2008/0204773, which is a patch-based decoder. Since colored barcodes need to be processed on a pixel by pixel basis, a number of cleanup steps were performed to remove classification errors from the decoded barcodes. In the exemplary embodiments described herein, far less classification errors are made and one less cleanup step is required. The deleted cleanup step is that of replacing pixel columns with the column average. That step required that the barcode was already de-skewed before processing. The exemplary embodiments allow for the separation of skewed colored barcodes.

In addition the prior art color barcode decoding concept may be limited to operating on one dimensional barcodes due to the possible requirement of doing the column averaging step. The exemplary embodiments allow for the processing of two dimensional color barcodes and have been demonstrated to work with the PDF417 encoding. PDF417 is a stacked linear bar code symbol used in a variety of applications, primarily transport, identification cards, and inventory management. PDF stands for Portable Data Format.

Thus, the exemplary method may further include printing a bar code using the two distinct primary or overprint colors. The bar code may be a two dimensional bar code and that the primary colors may be colors of at least two independent bar codes. Note that the step of receiving a target color as described above may also include scanning a bar code printed using at least two distinct primary or overprint colors to produce a scanned image and selecting a pixel of the scanned image.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method of processing identified colors, comprising:
   storing nominal colors and actual colors at array locations in a proximity array; and
   dilating the proximity array until each array location contains a nominal color and an actual color and the actual color is an identified color closest to the color corresponding to that array location;
   wherein, for at least one nominal color, a plurality of actual colors is stored for the same nominal color.

2. The method of claim 1, wherein the step of dilating the proximity array further comprises:
   identifying a source voxel having a given nominal color;
   determining whether a neighboring voxel is occupied;
   if the neighboring voxel is not yet occupied, assigning the nominal color value of the source voxel to the neighboring voxel;
   if the neighboring voxel is occupied, replacing a value of the neighboring voxel only if the nominal color of the neighboring voxel is closer to the nominal color of the source voxel than to the nominal color already in that voxel.

3. The method of claim 1, further comprising:
   receiving a target color;
   using the target color to index into the proximity array; and
   determining the nominal color corresponding to the target color.

4. The method of claim 1, further comprising
   printing one or more copies of a plurality of patches corresponding to patch codes; and
   measuring the printed patches, wherein the actual colors are the measured colors.

5. The method of claim 4, wherein measuring the printed patches further comprises:
   scanning using a scanner;
   locating at least one patch; and
   averaging pixel values within the at least one patch.

6. The method of claim 4, further comprising:
   using a spectrophotometer to measure the printed patches.

7. The method of claim 1, wherein the nominal colors are either actual color names in a natural language or references to color names in a natural language.

8. The method of claim 1, further comprising:
   printing at least two copies of at least two distinct primary or overprint colors;
   printing at least two copies of at least one color that is a linear combination of the two distinct primary or overprint colors; and
   measuring the printed colors, wherein the actual colors are the measured colors.

9. The method of claim 3, further comprising:
   determining amounts of at least one primary color from the determined nominal color.

10. The method of claim 8, further comprising:
    printing a bar code using the at least two distinct primary or overprint colors.

11. The method of claim 3, wherein the step of receiving a target color further comprises:
    scanning a bar code printed using at least two distinct primary or overprint colors to produce a scanned image; and
    selecting a pixel of the scanned image.

12. The method of claim 10, wherein the bar code is a two dimensional bar code.

13. The method of claim 11, wherein the bar code is a two dimensional bar code.

14. The method of claim 9, wherein the primary colors are colors of at least two independent bar codes.

15. The method of claim 8, further comprising:
    printing at least two halftoned images using the at least two distinct primary colors.

16. The method of claim 9, wherein the primary colors are colors in which at least two halftoned images were printed.

17. The method of claim 8, wherein at least one of the at least two distinct primary colors is a spot color.

18. The method of claim 9, wherein the at least one primary color includes at least one spot color.

19. A digital image processing apparatus for processing identified colors, the apparatus comprising:
    a database that stores data related to digital image processing; and
    an image processing unit that includes a processor, a system memory, and a system bus that couples the system memory to the processing unit, wherein the image processing unit is operative to store nominal colors and actual colors at array locations in a proximity array and dilate the proximity array until each array location contains a nominal color and an actual color and the actual color is an identified color closest to the color corresponding to that array location, wherein, for at least one nominal color, a plurality of actual colors are stored for the same nominal color.

20. The apparatus of claim 19, wherein the image processing unit is further operative to:
    identify a source voxel having a given nominal color;
    determine whether a neighboring voxel is occupied;
    if the neighboring voxel is not yet occupied, assign the nominal color value of the source voxel to the neighboring voxel;
    if the neighboring voxel is occupied, replace a value of the neighboring voxel only if the nominal color of the neighboring voxel is closer to the nominal color of the source voxel than to the nominal color already in that voxel.

21. The apparatus of claim 19, wherein the image processing unit is further operative to:
    receive a target color;
    use the target color to index into the proximity array; and
    determine the nominal color corresponding to the target color.

22. The apparatus of claim 21, further comprising:
    an image output device that prints one or more copies of a plurality of patches corresponding to patch codes; and a scanning mechanism that measures the printed patches, wherein the actual colors are the measured colors.

23. The apparatus of claim 22, further comprising a scanner for scanning the printed patches and wherein the image processing unit is further operative to locate at least one patch and average pixel values within the at least one patch.

24. The apparatus of claim 22, further comprising:
a spectrophotometer that measures the printed patches.

25. The apparatus of claim 19, wherein the nominal colors are either actual color names in a natural language or references to color names in a natural language.

26. The apparatus of claim 21, further comprising:
an image output device that is operative to print at least two copies of at least two distinct primary or overprint colors and print at least two copies of at least one color that is a linear combination of the two distinct primary or overprint colors; and
a scanning mechanism that measures the printed colors, wherein the actual colors are the measured colors.

27. The apparatus of claim 21, wherein the image processing unit is further operative to determine amounts of at least one primary color from the determined nominal color.

28. The apparatus of claim 22, wherein the image output device is further operative to print a bar code using the at least two distinct primary or overprint colors.

29. The apparatus of claim 21, further comprising:
a scanner that scans a bar code printed using at least two distinct primary or overprint colors to produce a scanned image; and
means for selecting a pixel of the scanned image.

30. The apparatus of claim 28, wherein the bar code is a two dimensional bar code.

31. The apparatus of claim 29, wherein the bar code is a two dimensional bar code.

32. The apparatus of claim 27, wherein the primary colors are colors of at least two independent bar codes.

33. The apparatus of claim 26, wherein the image output device is further operative to print at least two halftoned images using the at least two distinct primary colors.

34. The apparatus of claim 27, wherein the primary colors are colors in which at least two halftoned images were printed.

35. The apparatus of claim 26, wherein at least one of the at least two distinct primary colors is a spot color.

36. The apparatus of claim 27, wherein the at least one primary color includes at least one spot color.

37. A computer program product comprising:
a non-transitory computer storage media storing instructions that, when executed by a computer, cause the computer to perform a method comprising:
storing nominal colors and actual colors at array locations in a proximity array; and
dilating the proximity array until each array location contains a nominal color and an actual color and the actual color is an identified color closest to the color corresponding to that array location;
wherein, for at least one nominal color, a plurality of actual colors is stored for the same nominal color.

38. The product of claim 37, wherein the step of dilating the proximity array further comprises:
identifying a source voxel having a given nominal color;
determining whether a neighboring voxel is occupied;
if the neighboring voxel is not yet occupied, assigning the nominal color value of the source voxel to the neighboring voxel;
if the neighboring voxel is occupied, replacing a value of the neighboring voxel only if the nominal color of the neighboring voxel is closer to the nominal color of the source voxel than to the nominal color already in that voxel.

39. The product of claim 37, wherein the method further comprises:
receiving a target color;
using the target color to index into the proximity array; and
determining the nominal color corresponding to the target color.

40. The product of claim 37, wherein the method further comprises:
printing one or more copies of a plurality of patches corresponding to patch codes; and
measuring the printed patches, wherein the actual colors are the measured colors.

* * * * *